United States Patent [19]

Kato et al.

[11] 4,414,581
[45] Nov. 8, 1983

[54] IMAGE SIGNAL PROCESSING METHOD AND APPARATUS THEREFOR

[75] Inventors: Yuzo Kato, Yokohama; Shunichi Ishihara, Kodaira; Yasushi Sato, Kawasaki; Nobuyoshi Tanaka, Yokohama; Naoto Kawamura, Inagi; Hisashi Nakatsui, Kawasaki, all of Japan

[73] Assignee: Canon Kabushiki Kaisha, Tokyo, Japan

[21] Appl. No.: 313,302

[22] Filed: Oct. 20, 1981

[30] Foreign Application Priority Data

Nov. 1, 1980 [JP] Japan ................................ 55-154017

[51] Int. Cl.³ .............................................. H04N 1/40
[52] U.S. Cl. ..................................... 358/280; 358/283
[58] Field of Search .................................. 358/280, 783

[56] References Cited

U.S. PATENT DOCUMENTS

| 4,251,837 | 2/1981 | Janeway | 358/280 |
| 4,258,393 | 3/1981 | Ejiri | 358/280 |
| 4,288,821 | 9/1981 | Lavallee | 358/280 |
| 4,349,846 | 9/1982 | Sekigawa | 358/280 |

Primary Examiner—Howard Britton
Attorney, Agent, or Firm—Fitzpatrick, Cella, Harper & Scinto

[57] ABSTRACT

An image signal processing method and apparatus for practicing the method are capable of identifying and differentiating information not having tonal rendition such as characters and linetone images from information having tonal rendition such as photographs and pictures, based on the difference of signal characteristics, for example based on the fact that the spatial frequency distribution in portions of an image not having tonal rendition are in the higher frequency range compared to that of the portions of the image having tonal rendition. The method and apparatus are also capable of conducting different processes on the identified different images.

13 Claims, 4 Drawing Figures

IMAGE SIGNAL PROCESSING METHOD AND APPARATUS THEREFOR

BACKGROUND OF THE INVENTION

1. Field of the Invention

The present invention relates to an image signal processing method for processing an image having a continuous tone and to an apparatus for practicing the method.

2. Description of the Prior Art

Common documents such as newspapers, magazines, business reports and the like composed of characters, linetone images, photographs etc.

Characters and linetone images are composed of lines with little tonal rendition and require greater sharpness than images with tonal rendition since importance is given to legibility transmitting the meaning of the images.

On the other hand, photographs and pictures are composed of image components rich in tonal rendition, and emphasis of such tonal rendition is important since such images transmit emotional information.

Further an image field is often composed of a group of images requiring different image qualities.

In order to form such an image, including portions having a continuous tone, with binary representation, there are already known dot-pattern methods and dither methods. In the dot-pattern methods the gradation of the image is represented by dividing the image into small sections and changing the area of a micro-element, such as a dot or a line, in each section.

In the dither methods, the gradation is represented by changing, independently from the image, the threshold value for digitalizing the signals of an image divided into small sections. For example in the so-called systematic dither method, an image composed of a matrix arrangement of picture elements or pixels is divided into sub-matrices each composed of $n \times n$ pixels, and a dither pattern corresponding to the dimension of each sub-matrix is prepared and utilized as the threshold value for digitizing the signals of the pixels.

For an image displaying device such as a liquid crystal device or ink jet printer in which pixels of a determined shape arranged in a matrix are controlled by electric signals to be respectively on or off, processing with the dither method, particularly the systematic dither method, is most suitable.

The conventional systematic dither method, however, is unsatisfactory since the edge characteristic, particularly the sharpness in representing tonal rendition, and in producing moire stripes, in the use of $n \times n$ dither pattern, is sacrificed due to the interference between the periodicity of the image and the periodicity of digitizing threshold values repeated by n pixels.

SUMMARY OF THE INVENTION

The object of the present invention is to provide an image signal processing method and apparatus for practicing this method not characterized by the drawbacks of the conventional methods and apparatus.

Another object of the present invention is to provide an image signal processing method and apparatus for practicing this method capable of image processing matching of the entered image signals.

Still another object of the present invention is to provide an image signal processing method capable of indentifying information not involving tonal rendition such as characters and linetone images and distinguishing it from information involving tonal rendition such as photographs and pictures based on the difference of signal characteristics, for example based on the fact that the spatial frequency distribution in portions of the image not involving tonal rendition is in the higher frequency range compared with that portion of the image involving tonal rendition. This method is also capable of conducting different processes on different images.

Still another object of the present invention is to provide an image signal processing method capable of identifying information not involving tonal rendition and distinguishing it from information involving tonal rendition based on the fact that the former is composed of lines in the range of ca. 0.1 to 0.5 mm and of conducting different processes on such different information.

Still other objects and advantages of the present invention will be made apparent from the following description of the preferred embodiments to be taken in conjunction with the attached drawings.

DESCRIPTION OF THE PREFERRED EMBODIMENTS

Figure 1:
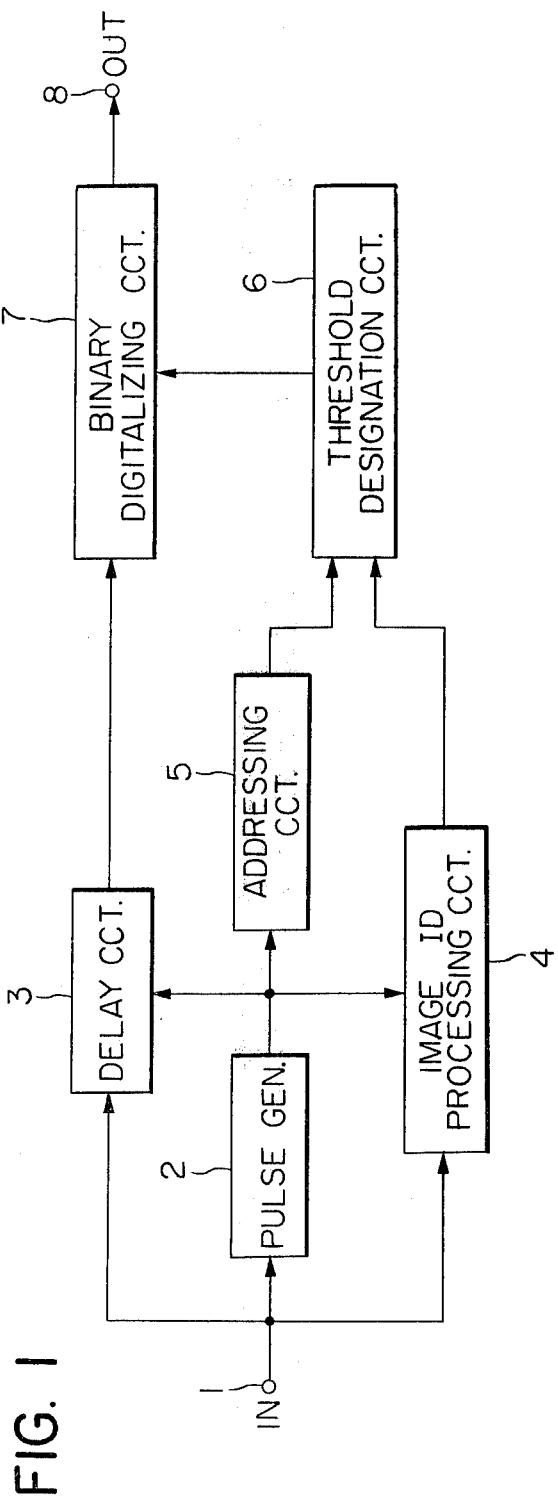
FIG. 1 is a block diagram showing an embodiment of the present invention.
Figure 2:
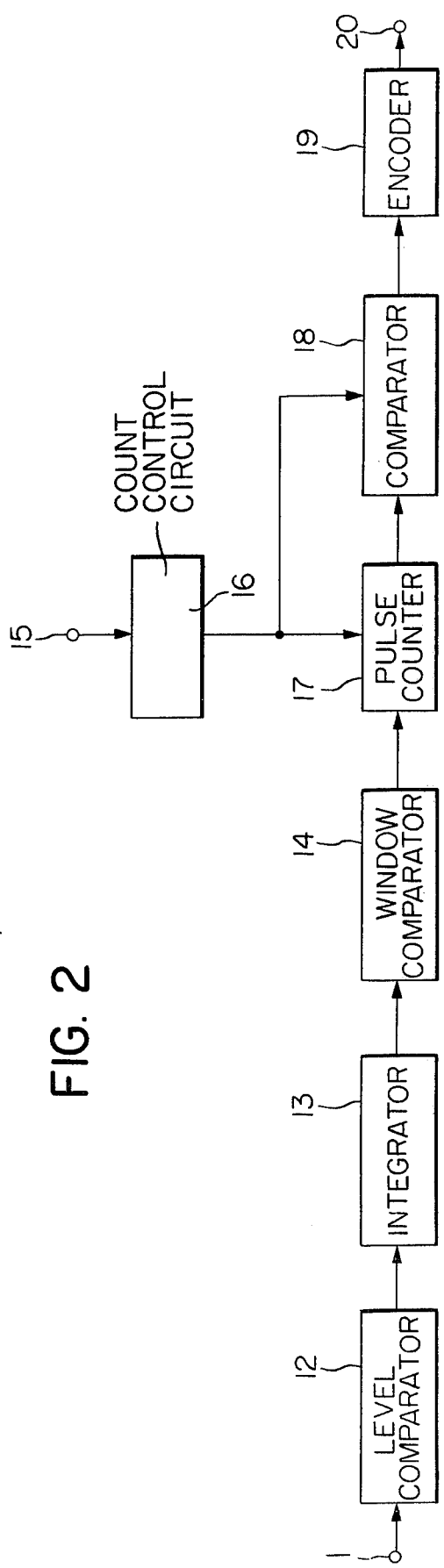
FIG. 2 is a block diagram of the image identifying and processing circuit.

FIG. 1 is a block diagram of an embodiment of the present invention and illustrates an input terminal 1 for receiving image signals obtained by raster scanning of an image, and a pulse generator 2 for generating pulse signals synchronized with the start of image signals in each line scanned for sampling the image signals. An image identification process circuit 4 is composed, as shown in FIG. 2, of a level comparator 12, and integrator 13, a window comparator 14, an input terminal 15, a count control circuit 16, a pulse counter 17, a comparator 18, an encoder 19 and an output terminal 20 and identifies whether an image in a unit block composed of n sampling points belongs to a category comprising photographs and pictures or another category comprising characters and linetone images. In FIG. 1, a delay circuit 3 composed of a serial analog delay line has a delay time for delaying the image signals corresponding to the n sampling points in synchronization with the clock pulses supplied from said pulse generator 2.

An addressing circuit 5 counts the pulse signals from the pulse generator 2 and provides two-dimensional coordinate (l, m) for the signal to be processed by a binary digitalizing circuit to be explained later, wherein l is the number of scanning line and m is the number of pixel on the scanning line.

Figures 3, 4:
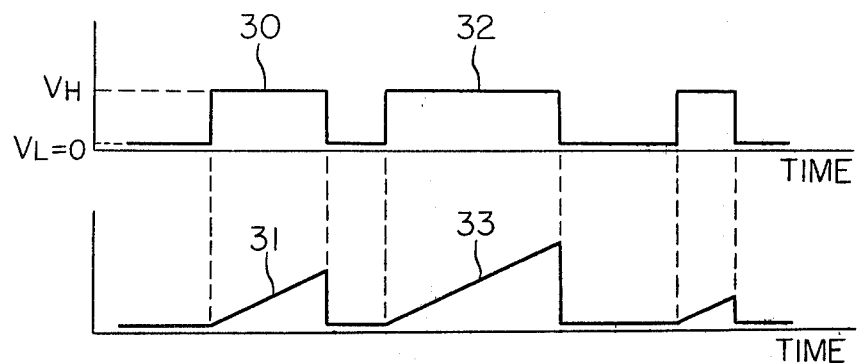
FIG. 3 is a waveform chart.
FIG. 4 is a view showing dither patterns.

A threshold value designating circuit 6 is composed of a programmable read-only memory PROM and a control circuit, where the read-only memory stores basic dither patterns 50, 51 as shown in FIG. 4 respectively for the picture category and for the character category. Each of said dither patterns contains a threshold value at each two-dimensional position (l, m), and released is a threshold value of an address designated by the signals from the addressing circuit 5 and from the image identification process circuit 4.

FIG. 4 shows the basic dither patterns as composed of 4×4 pixels, each of which is repeatedly utilized in the dither processing.

The dither pattern 50, proposed by Bayer, is employed in processing image information involving tonal rendition, and provides 16 threshold values from 0 to 15 in binary ditigalization of image signals.

The other dither pattern 51 is employed in processing image information not involving tonal rendition, and provides threshold values from 2 to 11. The image subjected to binary digitalization with said dither pattern 51 shows an enhanced contrast in comparison with the image processed with the dither pattern 50.

Consequently the pattern 51 is suitable for a processing requiring sharpness and contrast rather than tonal rendition, such as for linetone images, and the pattern 50 is suitable for a processing requiring tonal rendition.

Again referring to FIG. 1, a binary digitizing circuit 7 converts the image signals into binary signals through comparison with the threshold values supplied from the threshold value designating circuit 6. In this manner the image signals entered from the input terminal 1 are converted into binary signals by the basic dither patterns supplied from said circuit 6.

The binary signals thus obtained are supplied through the output terminal 20 to a display device or a recording device for image display thereon.

The function of the embodiment shown above is explained below wherein the identification of whether the entered image signals involve tonal rendition is conducted utilizing the fact that the line width in linetone images is generally in the range of ca. 0.1 to 0.5 mm.

Upon entry into the input terminal 1 of the image signals obtained by raster scanning of an image by means of a line sensor such as a charge-coupled device, the image identification process circuit 4 identifies, in synchronization with the pulses from the pulse generator, whether the image in a unit block composed of n sampling points in the entered image signals belongs to the category of photographs and pictures, or to the category of characters and linetone images.

Said identification operation by said circuit 4 will be explained in further detail with reference to FIG. 2.

The image signals entered into the input terminal 1 are converted by the level comparator 12 into binary pulse signals having high-level or low (zero)-level respectively when the image signals are higher or lower than a determined level. Said pulse signals are then supplied to the integrator 13 for integration for each pulse.

FIG. 3 shows the relationship between the input signals and output signals of the integrator 13, wherein the input pulses 30, 32 supplied from said level comparator 12 are respectively integrated by the integrator 13 into signals 31, 33 to be supplied to the window comparator 14. Since the integrating time in the integrator 13 is equal to the duration of each entered binary pulse, the maximum value of the integrated signals 31, 33 is proportional to the duration of the input pulses 30, 32.

The window comparator 14 has two determined levels $V_{w1}$ and $V_{w2}$ which respectively are equal to the maximum values of the signals obtained from the level comparator 12 and the integrator 13 in response to image signals corresponding to line widths of 0.1 and 0.5 mm. The window comparator provides a high-level output or a low-level output respectively when the amplitude level V of the signal satisfies a relation $V_{w1} \leq V \leq V_{w2}$ or not.

Consequently it is possible to know the number of image signals corresponding to a line width from 0.1 to 0.5 mm by counting the output pulses from the window comparator 14 within a determined time.

The input terminal 15 receives the pulse signals supplied from the pulse generator 2. Said pulse signals are utilized as reference signals in the sampling process of the image signals, and it is possible to divide the image signals into a signal component containing n sampling points by counting the number of said pulse signals. Thus the count control circuit 16 determines the sampling time, or the time for counting the output pulses from the window comparator 14, by counting the number of pulses entered from the terminal 15.

The pulse counter 17 is provided for counting the output pulses from the window comparator 14, or namely the number of image signals representing lines of a width from 0.1 to 0.5 mm, within the period thus determined by the control circuit 16. Said control circuit 16 also determines the function timing of the comparator 18.

The comparator 18 compares the count of said pulse counter 17 with a determined number N in order to identify whether the image of a divided time belongs to the picture image category or to the linetone image category, and considers the image information of a sampled block as a linetone image when said count exceeds said number N.

The encoder stores code signals respectively corresponding to the picture and the linetone image, and supplies a code corresponding to the identification by the comparator 18 to the threshold value designating circuit 6 shown in FIG. 1.

Again referring to FIG. 1, the delay circuit 3 delays, in synchronization with the clock pulses from the pulse generator 2, the entered image signals by a time corresponding to the n sampling points, whereby the image signals are supplied to the binary digitalizing circuit 7 with a delay corresponding to a time required by the image identification process circuit 4 to complete the aforementioned identification process on the entered image signals.

The addressing circuit 5 counts the pulse signals from the pulse generator 2 and releases two-dimensional addresses (l, m) of the image signals to be processed in the binary digitalizing circuit 7, wherein l is the number of the scanning line and m is the position of the pixel on said scanning line. The output signals from said addressing circuit 5 and from the image identification process circuit 4 are supplied to the threshold value designating circuit 6, and the dither patterns 50, 51 stored in the memory PROM of said circuit 6 are addressed by said signals to provide numeral data of said dither patterns to the binary digitalizing circuit 7 for processing therein.

Said circuit 7 executes the conversion to binary signals upon comparison of the threshold values supplied from said threshold value designating circuit 6 with the image signals supplied from the delay circuit 3, and supplies thus obtained binary signals to output devices through the output terminal 8.

Although the foregoing embodiment utilizes the fact that the line width in a linetone image is principally in a range from 0.1 to 0.5 mm in order to identify if the image in a unit block is a picture image or a linetone image, it is also possible to utilize the spatial frequency characteristics for such identification. In such case image identification process circuit 4 is provided with two filters of mutually different frequency characteristics, and the output signals of said filters are compared in a comparator to identify if the entered image signals contain tonal rendition. The correspondingly one of the dither patterns stored in the threshold value designating circuit 6 is then selected as described above.

Also in the foregoing embodiment the dither process is made different according to the identification of either a picture image or a linetone image, but it is possible to effect a dither process emphasizing sharpness in case the image in a unit block contains a larger amount of higher frequency components.

Also as a dither process emphasizing sharpness, there can be employed a process giving enhanced contrast to each of the threshold values of the dither matrix, or even an ordinary binary digitalization without dither process.

Furthermore the image identification can be achieved also by the power or maximum amplitude of the signal obtained by differentiating the image signals.

As explained in the foregoing the present invention identifies the state of the image signals in each block and effects binary digitalization with a dither pattern selected according to the result of said identification. Consequently it is rendered possible to improve the image quality by conducting different image processings for an image area requiring tonal rendition such as a picture and for an image area requiring sharpness such as a linetone image. Also the matching between the image and the image processing is improved since the dither process is controlled according to the image identification in a one-dimensional block of the image along the scanning line therein, in contrast to the conventional dither process based on a two-dimensional image block.

What we claim is:

1. An image signal processing apparatus, comprising:
   means for identifying the content of entered image signals;
   means for storing plural groups of threshold values for binary digitalization of the image signals;
   means for selecting a suitable group of threshold values in accordance with the identification of the content of entered image signals by said identifying means, and for providing threshold values of the group so selected from said storing means; and
   means for binary digitalization of said image signals by means of the threshold values provided by said selecting and providing means.

2. An image signal processing apparatus according to the claim 1, wherein said identifying means is adapted to divide the entered image signals into a determined amount and to identify the content of the image signals of the divided amount.

3. An image signal processing apparatus according to the claim 1, wherein said binary digitalizing means comprises delaying means for delaying the entered image signals for a time corresponding to the function time of said identifying means.

4. An image signal processing apparatus according to the claim 1, wherein said identifying means is adapted to identify whether the entered image signals represent an image involving tonal rendition.

5. An image signal processing apparatus according to claim 4 wherein said identifying means is adapted to detect the spatial frequency of the entered image signal.

6. An image signal processing apparatus according to claim 1, wherein said identifying means integrates the black level of signals comprising the entered image signals and identifies the content of the image signals in accordance with the result of the integration.

7. An image signal processing apparatus according to claim 6 wherein said identifying means identifies the content of the image signals by means of comparison of the integration value and a reference value.

8. An image signal processing method which comprises the steps of dividing entered image signals into a predetermined amount, identifying whether or not the image signals of the divided amount represent an image involving tonal rendition by counting the number of image signals corresponding to a linetone image within said divided image signals, and processing the divided image signals according to the result of said identification.

9. An image signal processing method according to the claim 8, further comprising the step of determining threshold values for binary digitalization of the image signals according to the result of said identification.

10. An image signal processing method according to claim 8 wherein said identifying step comprises integrating the black level of signals comprising the image signals divided into a predetermined amount and identifying that the divided image signals are image signals corresponding to the linetone image, if the integrated value is within a predetermined range.

11. An image signal processing apparatus, comprising:
    means for storing plural groups of threshold values for binary digitalization of entered image signals;
    means for counting the image signals corresponding to linetone image entered within a predetermined time to identify whether or not the entered image signals within the predetermined time represent an image involving tonal rendition;
    means for selecting one of said groups of threshold values stored in said storing means in accordance with the result of said counting and for providing threshold values of the group so selected from said storing means; and
    means for binary digitalization of said image signals by means of the threshold values provided by said selecting and providing means.

12. An image signal processing apparatus according to the claim 11, wherein said counting means comprises means for identifying whether the entered image signals represent a linetone image according to the input duration of black-level image signals.

13. An image signal processing apparatus according to the claim 1 or 11, wherein said storing means comprises a group of threshold values corresponding to a linetone image and another group of threshold values corresponding to an image having tonal rendition.

* * * * *